United States Patent
Swaita et al.

(10) Patent No.: US 9,394,991 B2
(45) Date of Patent: Jul. 19, 2016

(54) MECHANISM FOR VEHICLE TRANSMISSION DEFAULT TO PARK

(71) Applicants: GM GLOBAL TECHNOLOGY OPERATIONS LLC, Detroit, MI (US); Stoneridge Control Devices, Inc., Canton, MA (US)

(72) Inventors: Daniel Swaita, Whitby (CA); David A. Provenza, Shelby Township, MI (US); Brian Ganter, Foxborough, MA (US); Robert DiTommaso, Waltham, MA (US); Karthik Kayyer, Mysore (IN); William Harrop, Stoughton, MA (US)

(73) Assignees: GM Global Technology Operations LLC, Detroit, MI (US); Stoneridge Control Devices, Inc., Canton, MA (US)

( * ) Notice: Subject to any disclaimer, the term of this patent is extended or adjusted under 35 U.S.C. 154(b) by 267 days.

(21) Appl. No.: 14/269,816

(22) Filed: May 5, 2014

(65) Prior Publication Data

US 2015/0143938 A1 May 28, 2015

Related U.S. Application Data

(60) Provisional application No. 61/909,089, filed on Nov. 26, 2013.

(51) Int. Cl.
| | |
|---|---|
| *B60K 17/04* | (2006.01) |
| *F16H 61/22* | (2006.01) |
| *F16H 61/32* | (2006.01) |
| *F16H 61/12* | (2010.01) |

(52) U.S. Cl.
CPC ........ *F16H 61/22* (2013.01); *F16H 2061/1232* (2013.01); *F16H 2061/326* (2013.01); *Y10T 74/2003* (2015.01); *Y10T 74/20067* (2015.01)

(58) Field of Classification Search
CPC ... F16H 2061/223; F16H 61/16; F16H 61/32; F16H 2059/0295; F16H 2061/326; F16H 61/12; F16H 2061/1232; F16H 61/22
See application file for complete search history.

(56) References Cited

U.S. PATENT DOCUMENTS

| | | | |
|---|---|---|---|
| 6,550,351 B1 | 4/2003 | O'Reilly et al. | |
| 6,918,314 B2 * | 7/2005 | Wang | F16H 59/08 74/335 |
| 7,137,311 B1 * | 11/2006 | Neubauer | F16H 61/28 74/335 |
| 8,209,098 B2 | 6/2012 | Buur et al. | |
| 2003/0029261 A1 * | 2/2003 | DeJonge | B60K 37/06 74/335 |
| 2004/0261559 A1 * | 12/2004 | Ozaki | F16H 61/32 74/473.12 |
| 2005/0184534 A1 * | 8/2005 | Oberheide | E05B 81/14 292/201 |
| 2011/0126657 A1 | 6/2011 | Ganter et al. | |
| 2013/0024079 A1 * | 1/2013 | Sekiya | F16H 61/32 701/51 |

* cited by examiner

*Primary Examiner* — David M Fenstermacher
*Assistant Examiner* — Jake Cook
(74) *Attorney, Agent, or Firm* — Quinn Law Group, PLLC

(57) ABSTRACT

A default-to-park mechanism for a transmission includes an output member, a rotatable plate, a latching mechanism, and a biasing member. The output member is rotatable to park, reverse, neutral, and drive positions. The rotatable plate is coaxial with the output member. The plate and the output member interfere with one another such that the plate is moved in a first direction of rotation by the output member and the output member is moved in a second direction of rotation by the plate. The plate is releasably held by the latching mechanism to prevent rotation in the second direction of rotation when the output member is in the reverse, neutral, and drive positions. The biasing member biases the plate to rotate in the second direction of rotation to return the output member to the park position when the plate is released by the latching mechanism.

20 Claims, 6 Drawing Sheets

MECHANISM FOR VEHICLE TRANSMISSION DEFAULT TO PARK

TECHNICAL FIELD

The present teachings generally include a mechanism to default a vehicle transmission to park.

BACKGROUND

Shift-by-wire vehicle transmissions may default to park during predetermined events. It is desirable that commanded transmission states are achieved without extended delay.

SUMMARY

A mechanism for a transmission having a park mode and multiple additional modes is provided. The mechanism includes an output member, a rotatable plate, a latching mechanism, and a biasing member. The output member is operatively connectable to the transmission and rotatable to predetermined positions including a park position correlated with the park mode and multiple additional positions correlated with the multiple additional modes, respectively. The rotatable plate is coaxial with the output member. The plate and the output member are configured to interfere with one another such that the plate is moved in a first direction of rotation by the output member when the output member is rotated in the first direction of rotation, and the output member is moved in a second direction of rotation by the plate when the plate moves in the second direction of rotation. The second direction of rotation is opposite from the first direction of rotation. The plate is configured to be releasably held by the latching mechanism to prevent rotation in the second direction of rotation when the output member is in any one of the multiple additional positions. The biasing member biases the plate to rotate in the second direction of rotation to return the output member to the park position when the plate is released by the latching mechanism.

A vehicle is also provided. The vehicle includes a transmission, an operator interface, and a gear selection mechanism. The transmission has a park mode, multiple additional modes, and a mode selector. The mode selector is rotatable to predetermined positions including a park position correlated with the park mode and multiple additional positions correlated with the multiple additional modes, respectively. The gear selection mechanism is operatively connected to the operator interface. The gear selection mechanism includes an output member and a default-to-park mechanism. The output member is operatively connected to the mode selector to move the mode selector to a selected one of the park position and the multiple additional positions according to a selection input at the operator interface. The default-to-park mechanism is configured to override the selection and shift the transmission to the park mode. The default-to-park mechanism includes a rotatable plate, a latching mechanism, and a biasing member. The rotatable plate is coaxial with the output member. The plate and the output member are configured to interfere with one another such that the plate is moved in a first direction of rotation by the output member when the output member is rotated in the first direction of rotation, and the output member is moved in a second direction of rotation by the plate when the plate moves in the second direction of rotation. The second direction of rotation is opposite from the first direction of rotation. The plate is configured to be releasably held by the latching mechanism to prevent rotation in the second direction of rotation when the output member is in any one of the multiple additional positions. The biasing member biases the plate to rotate in the second direction of rotation to return the output member to the park position when the plate is released by the latching mechanism.

The mechanism and vehicle provided enable the transmission to default to park during predetermined events and to achieve commanded transmission states without extended delay. This functionality is achieved using minimal packaging space and relatively few components.

The above features and advantages and other features and advantages of the present teachings are readily apparent from the following detailed description of the best modes for carrying out the present teachings when taken in connection with the accompanying drawings.

DETAILED DESCRIPTION

Figure 1:
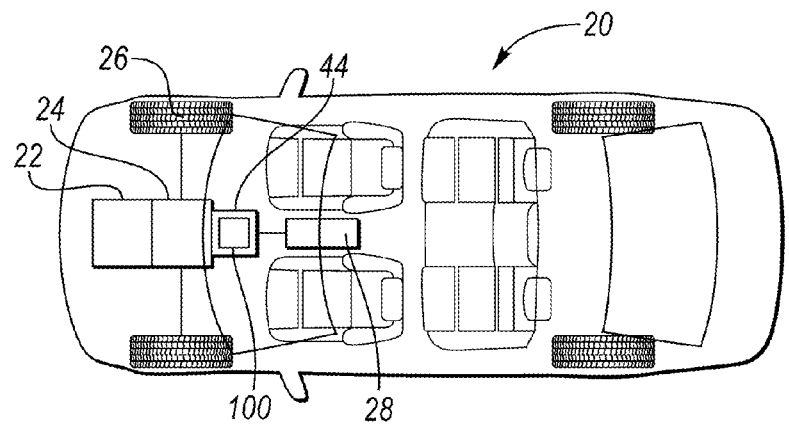
FIG. 1 is a schematic illustration of a vehicle having a gear selection mechanism with a default-to-park mechanism.

Referring to the drawings, wherein like reference numbers refer to like components throughout the views, FIG. 1 shows a vehicle 20 having an engine 22, a transmission 24, wheels 26, an operator interface 28, and a gear selection mechanism 44 having a default-to-park mechanism 100. The engine 22 is operatively connected to the transmission 24, which is operatively connected to the wheels 26. The transmission 24 has a park mode and multiple additional modes, which may include a reverse mode, a neutral mode, and a drive mode. In the drive and reverse modes, the transmission 24 provides power from the engine 22 to the wheels 26 at various gear ratios. In the neutral mode, the transmission 24 disconnects the wheels 26 from the engine 22, allowing the wheels 26 to rotate free of the engine 22. In the park mode, the transmission 24 disconnects the wheels 26 from the engine 22 and locks or restrains the wheels 26 from rotating. The transmission 24 may have other modes of operation.

An operator of the vehicle 20 makes a selection input at the operator interface 28 to select a mode of the transmission 24. The gear selection mechanism 44 is operatively connected to the operator interface 28 and is configured to shift the transmission 24 to the selection input by the operator at the operator interface 28. For example, the operator interface 28 may be a shift lever or a push button selector which allows the operator to select the park mode, the reverse mode, the neutral mode, or the drive mode of the transmission 24. The operator interface 28 may be electronically connected to the gear selection mechanism 44, i.e. a shift-by-wire transmission. The default-to-park mechanism 100 is configured to override the operator selection and shift the transmission 24 to the park mode during predetermined events. For example, the default-to-park mechanism 100 may override the operator selection and shift the transmission 24 to the park mode when the vehicle battery voltage drops below a predetermined value.

Figure 2:
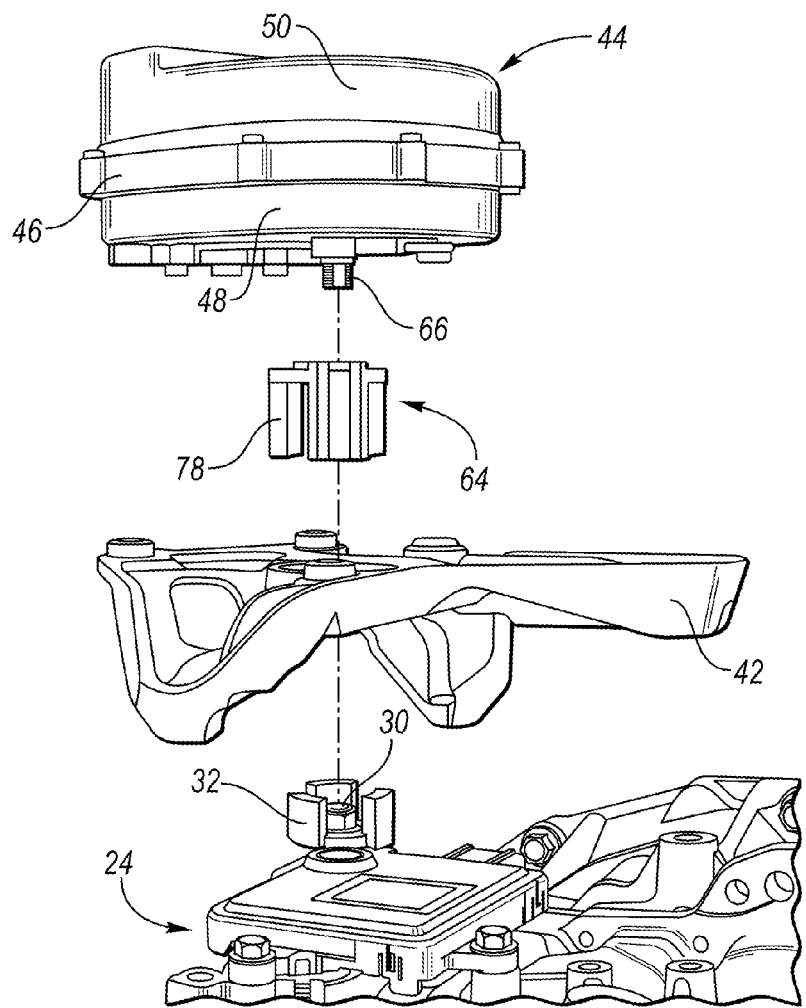
FIG. 2 is a schematic illustration in exploded partial perspective view of the gear selection mechanism with the default-to-park mechanism of FIG. 1 operatively connected to a transmission and showing a transmission mode selector.
Figure 3A:
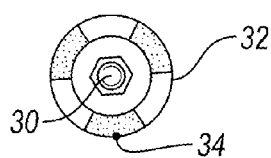
FIG. 3A is a schematic illustration in top view of the transmission mode selector of FIG. 2 in a park position to select a park mode of the transmission.
Figure 3B:
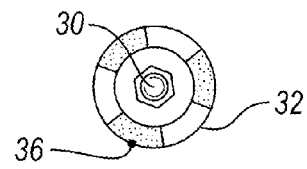
FIG. 3B is a schematic illustration in top view of the transmission mode selector of FIG. 2 in a reverse position to select a reverse mode of the transmission.
Figure 3C:
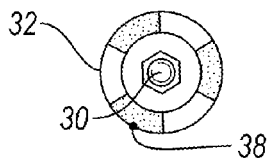
FIG. 3C is a schematic illustration in top view of the transmission mode selector of FIG. 2 in a neutral position to select a neutral mode of the transmission.
Figure 3D:
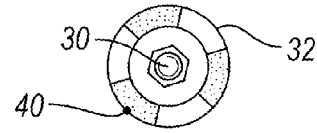
FIG. 3D is a schematic illustration in top view of the transmission mode selector of FIG. 2 in a drive position to select a drive mode of the transmission.

Referring now to FIG. 2, the transmission 24 has a mode selector 30 which may include a mode selector coupling 32. The gear selection mechanism 44 may have a case 46, which may include a base 48 and a cover 50. The gear selection mechanism 44 has an output member 64 which includes an output shaft 66. The output member 64 may include an output coupling 78. The output coupling 78 may be configured to cooperate with the mode selector coupling 32 to facilitate rotation of the mode selector 30 by the output member 64 and to facilitate assembly of the gear selection mechanism 44 to the transmission 24. The gear selection mechanism 44 may be attachable to the transmission 24 via an attachment bracket 42.

Referring now to FIGS. 3A-3D, the mode selector 30 is rotatable to predetermined positions including a park position 34 (FIG. 3A) and multiple additional positions, which may include a reverse position 36, (FIG. 3B), a neutral position 38, (FIG. 3C), and a drive position 40 (FIG. 3D), correlated with the park mode, the reverse mode, the neutral mode, and the drive mode, respectively. The mode selector 30 may have other positions correlated with other modes of the transmission 24. The output member 64 is operatively connected to the mode selector 30 to move the mode selector to a selected one of the park position 34, the reverse position 36, the neutral position 38, or the drive position 40 according to the selection input at the operator interface 28.

Figure 4:
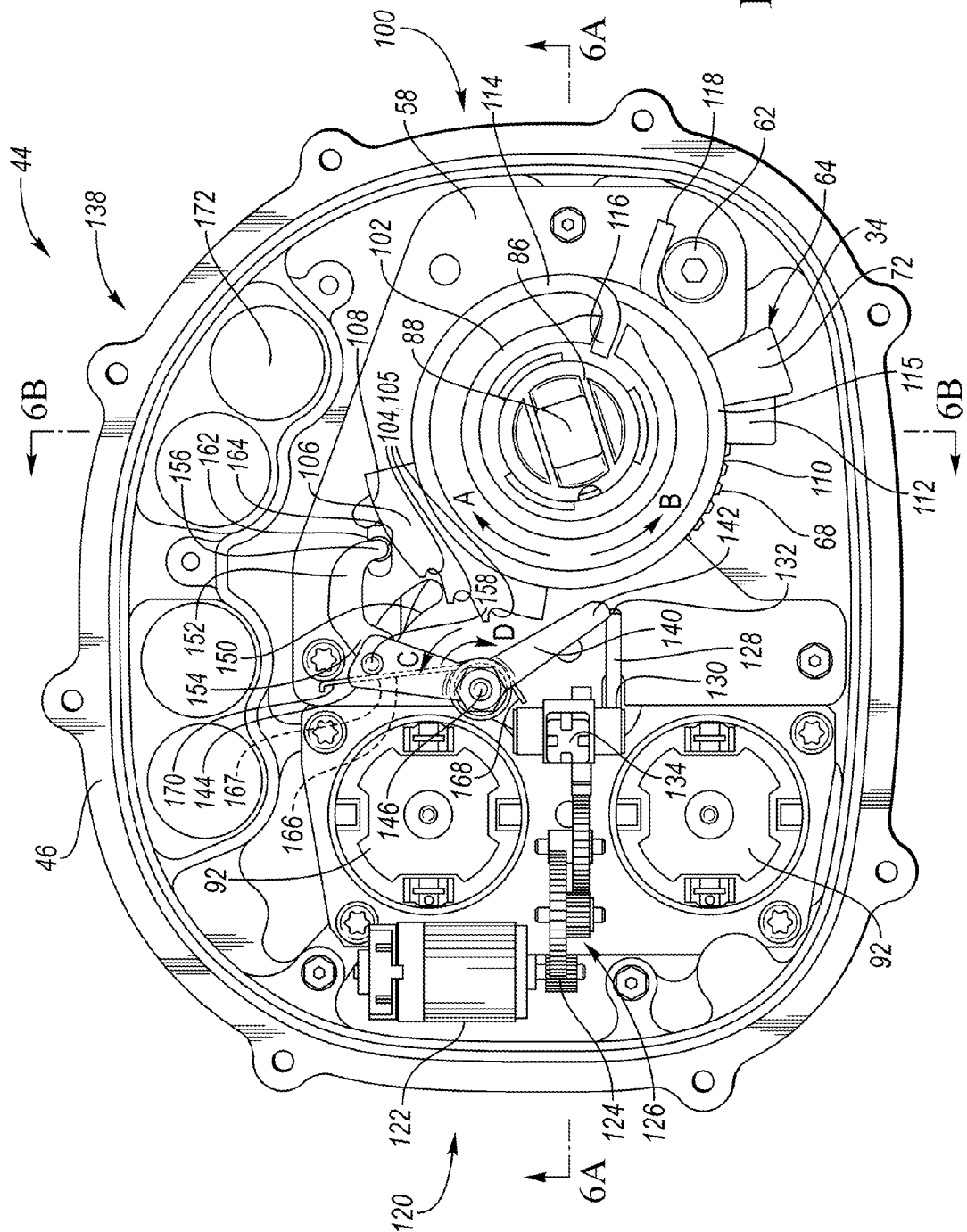
FIG. 4 is a schematic illustration in top view of the gear selection mechanism with the default-to-park mechanism of FIG. 2 with a cover and other parts removed for clarity.

Referring now to FIG. 4, the default-to-park mechanism 100 includes the output member 64, a rotatable plate 102, a latching mechanism 120, and a first biasing member 114. The rotatable plate 102 is coaxial with the output member 64. The plate 102 and the output member 64 are configured to interfere with one another such that the plate 102 is moved in a first direction of rotation, defined by arrow A, by the output member 64 when the output member 64 is rotated in the first direction of rotation A, and the output member 64 is moved in a second direction of rotation, defined by arrow B, by the plate 102 when the plate 102 moves in the second direction of rotation B. The second direction of rotation B is opposite from the first direction of rotation A.

The plate 102 is configured to be releasably held by the latching mechanism 120 to prevent rotation in the second direction of rotation B when the output member 64 is in the reverse position 36, the neutral position 38, or the drive position 40. In different embodiments, the latching mechanism 120 can prevent rotation in the second direction of rotation B when the output member 64 is in any two of these positions. The first biasing member 114 biases the plate 102 to rotate in the second direction of rotation B to return the output member 64 to the park position when the plate 102 is released by the latching mechanism 120.

The plate 102 has at least two features 104. Each of the features 104 is configured to receive the latching mechanism 120. The features 104 may be notches 105 or any other feature suitable for receiving the latching mechanism 120. Each of the notches 105 is positioned on the plate 102 to align the output member 64 with one of the reverse 36, neutral 38, and drive 40 positions when the latching mechanism 120 is received. The plate 102 may have a segment 106 with a radius 108. The segment 106 may include the notches 105. The radius 108 of the segment 106 is sized such that each of the notches 105 is sufficiently large to receive the latching mechanism 120.

The first biasing member 114 may be a helical torsion spring 115. The helical torsion spring 115 may be disposed around the rotatable plate 102 and may have a first end 116 and a second end 118. The first end 116 may be attached to the rotatable plate 102 and second end 118 may contact a spring reaction member 62.

Figure 8:
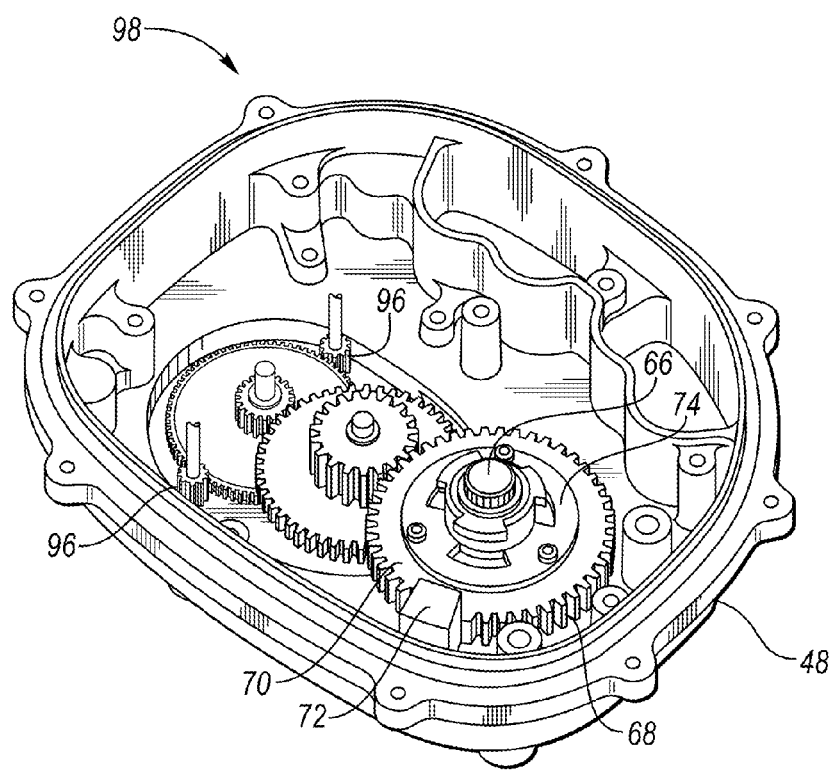
FIG. 8 is a schematic illustration in perspective view of the gear selection mechanism with the default-to-park mechanism of FIG. 4 with parts removed to show an output gear train.

The default-to-park mechanism 100 may include an output gear 68 and an output motor 92. The output gear 68 may be attached to the output member 64. The output motor 92 may be operatively connected to the output gear 68 and configured to provide torque to rotate the output gear 68, which in turn rotates the output member 64 in accordance with the selection input at the operator interface 28. The output motor pinion 96 may provide torque to rotate the output gear 68 through an output motor gear train 98, as best shown in FIG. 8. The output motor 92 may be an electric motor or may be any other motor suitable to provide torque to rotate the output gear 68.

The first biasing member 114 may exert a torque sufficient to overcome the torque of the output motor 64 when the plate 102 is released by the latching mechanism 120.

The latching mechanism 120 includes a selectively energizable actuator 122. The selectively energizable actuator 122 may be an electric motor or may be any other motor that is selectively energizable. When the actuator 122 is de-energized, the latching mechanism 120 is configured to allow the plate 102 to be rotated in the first direction of rotation A and to be received in any one of the notches 105 to prevent rotation of the plate 102 in the second direction of rotation B. When the actuator 122 is energized, the latching mechanism 120 is configured to withdraw from said any one of the notches 105 to release the plate 102 to rotate in the second direction of rotation B. The default-to park mechanism 100 may include a capacitor 172. The actuator 122 may be energized by the capacitor 172.

The latching mechanism 120 may also include an arm 140, a latch cam 152, and a second biasing member 166. The arm 140 may be operatively connected to the actuator 122. The latch cam 152 may be operatively connected to the arm 140 and configured to be received in any one of the notches 105. The second biasing member 166 may bias the latch cam 152 into contact with the plate 102 when the actuator 122 is de-energized.

The arm 140 may have a proximate end 142, a distal end 144, and an arm pivot 146 disposed between the proximate end 142 and the distal end 144. The arm 140 may be pivotally attached to a watch plate 58 at the arm pivot 146. The latch cam 152 may have a proximate end 154, a distal end 156, a latch cam pivot 158 disposed at the proximate end 154, and a feature 164 disposed at the distal end 156. The latch cam 152 may be pivotally attached to the arm 140 at the latch cam pivot 158. The second biasing member 166 may be a helical torsion spring 167. The helical torsion spring 167 may be disposed around the arm pivot 146 and may include a first end 168 and a second end 170. The first end 168 may be attached to the watch plate 58 and the second end 170 may contact the latch cam pivot 158.

Figure 7:
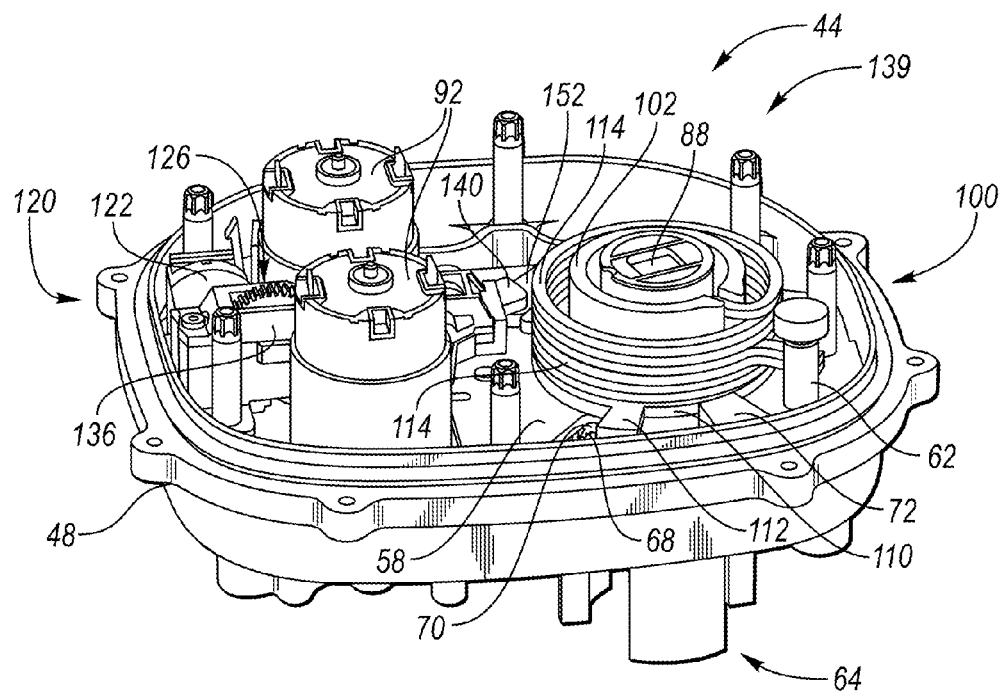
FIG. 7 is a schematic illustration in perspective view of the gear selection mechanism with the default-to-park mechanism of FIG. 4 with parts removed for clarity.

The latching mechanism 120 may also include an actuator pinion 124, an actuator gear train 126, and a trip arm 128. The actuator gear train 126 may be configured to rotate the trip arm 128 when the actuator pinion 124 is rotated by the actuator 122. The actuator gear train 126 may be disposed in an actuator gear train carrier 136 to facilitate assembly, as best shown in FIG. 7. The trip arm 128 has a proximate end 130 and a distal end 132. The proximate end 130 may be attached to the actuator gear train 126. When the actuator 122 is energized, the distal end 132 may move and apply an actuator force to the arm 140 which is greater than a bias force of the second biasing member 166 to urge the arm 140 to rotate in a first direction of rotation, defined by arrow C. When the actuator 122 is de-energized, the distal end 132 may move away from the arm 140 and may allow the second biasing member 166 to urge the arm 140 to rotate in the direction defined by arrow D. The second direction of rotation D is opposite from the first direction of rotation C.

The watch plate 58 may be configured to define an arm guide slot 150 to guide the movement of the arm 140. The watch plate 58 may also be configured to define a latch cam guide slot 162 to guide the motion of the latch cam 152.

Radial is defined as perpendicular to an axis of rotation of the output member 64 and the plate 102. Axial is defined as parallel to the axis of rotation of the output member 64 and the plate 102. The plate 102 may have an edge 110 and a plate tab 112, as best shown in FIG. 7. The plate tab 112 may extend radially outward from the edge 110 of the plate 102. The output member 64 may have a surface 70 and an output tab 72, as best shown in FIG. 8. The output tab 72 may extend axially from the surface 70 of the output member 64 toward the plate 102. Returning now to FIG. 4, the output tab 72 and plate tab 112 are configured to interfere with one another such that the plate 102 is moved in a first direction of rotation A by the output member 64 when the output member 64 is rotated in the first direction of rotation A, and the output member 64 is moved in a second direction of rotation B by the plate 102 when the plate 102 moves in the second direction of rotation B.

Figure 5A:
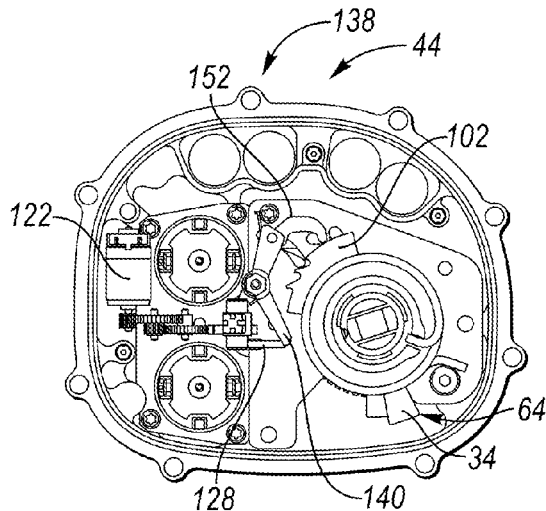
FIG. 5A is a schematic illustration in top view of the gear selection mechanism with the default-to-park mechanism of FIG. 4 in a tripped position and with an output member in a park position corresponding to the mode selector park position of FIG. 3A.
Figure 5B:
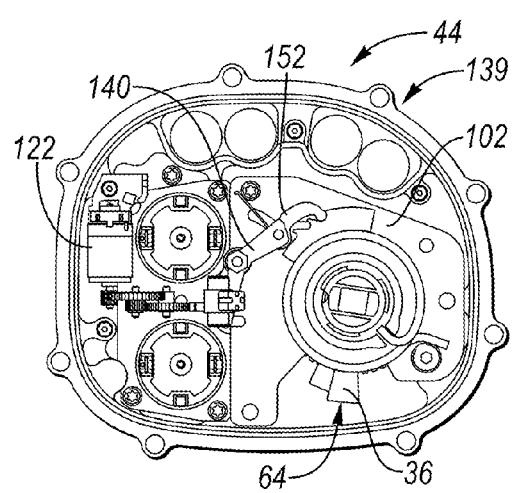
FIG. 5B is a schematic illustration in top view of the gear selection mechanism with the default-to-park mechanism of FIG. 4 latched in a reverse position and with the output member in a reverse position corresponding to the mode selector reverse position of FIG. 3B.
Figure 5C:
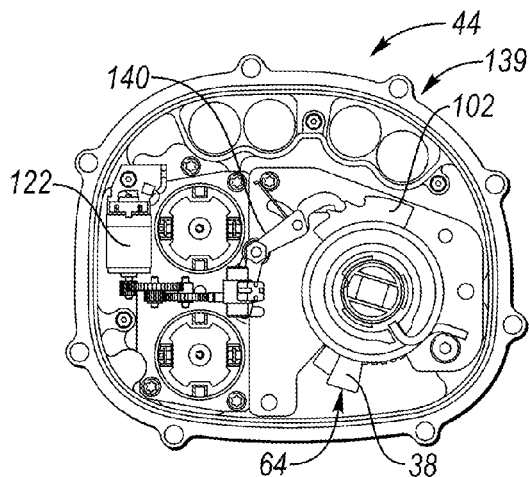
FIG. 5C is a schematic illustration in top view of the gear selection mechanism with the default-to-park mechanism of FIG. 4 latched in a neutral position and with the output member in a neutral position corresponding to the mode selector neutral position of FIG. 3C.

Referring now to FIGS. 5A-5D, the default-to-park mechanism 100 is shown in a tripped position 138, when the actuator 122 is energized (FIG. 5A) and in a latched position 139, when the actuator is de-energized (FIGS. 5B-5C). FIG. 5A shows the default-to-park mechanism 100 in the tripped position 138. The actuator 122 is energized and the latch cam feature 164 is withdrawn from the plate notches 105, allowing the output member 64 to be rotated, in the direction of arrow B, by the first biasing member 114 and the plate 102, to the park position 34.

FIG. 5B shows the default-to-park mechanism 100 in the latched position 139, when the actuator 122 is de-energized. The output member 64 has rotated the plate 102, in the direction of arrow A, to the reverse position 36. The plate 102 is latched in the reverse position 36 by the latch cam feature 164 received in the plate notch 105 associated with the reverse position 36. The output member 64 is shown in the reverse position 36. However, the output member 64 may be rotated to the park position 34, in the direction of arrow B, without unlatching or moving the plate 102. The output member 64 may be moved to the neutral position 38 and to the drive position 40 by rotating the plate 102, in the direction of arrow A. The latch cam feature 164 would then be received in the plate notch 105 associated with those positions, respectively.

FIG. 5C shows the default-to-park mechanism 100 in the latched position 139, when the actuator 122 is de-energized. The output member 64 has rotated the plate 102, in the direction of arrow A, to the neutral position 38. The plate 102 is latched in the neutral position 38 by the latch cam feature 164 received in the plate notch 105 associated with the neutral position 38. The output member 64 is shown in the neutral position 38. However, the output member 64 may be rotated to the reverse position 36 and to the park position 34, in the direction of arrow B, without unlatching or moving the plate 102. The output member 64 may be moved to the drive position 40 by rotating the plate 102, in the direction of arrow A. The latch cam feature 164 would then be received in the plate notch 105 associated with the drive position 40.

Figure 5D:
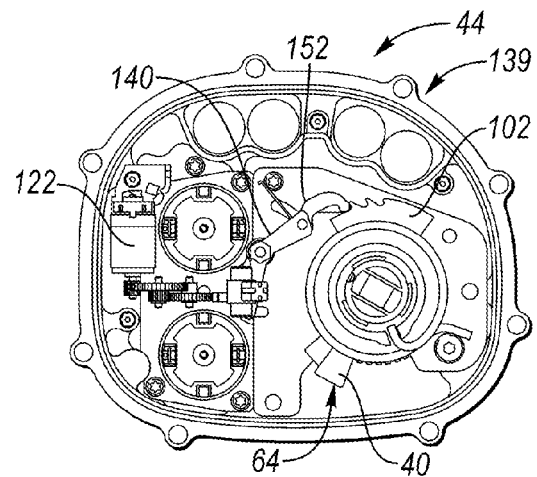
FIG. 5D is a schematic illustration in top view of the gear selection mechanism with the default-to-park mechanism of FIG. 4 latched in a drive position and with the output member in a drive position corresponding to the mode selector drive position of FIG. 3D.

FIG. 5D shows the default-to-park mechanism 100 in the latched position 139 when the actuator 122 is de-energized. The output member 64 has rotated the plate 102, in the direction of arrow A, to the drive position 40. The plate 102 is latched in the drive position 40 by the latch cam feature 164 received in the plate notch 105 associated with the drive position 40. The output member 64 is shown in the drive position 40. However, the output member 64 may be rotated to the neutral position 38, the reverse position 36, and the park position 34, in the direction of arrow B, without unlatching or moving the plate 102.

When a predetermined event occurs, the actuator 122 is energized and the default-to-park mechanism 100 is placed in the tripped position 138, as shown in FIG. 5A. The plate 102 may be latched in any of the park position 34, the reverse position 36, the neutral position 38, and drive position 40 when the default-to-park mechanism 100 is placed in the tripped position 138. The latch cam feature 164 is then withdrawn from the plate notches 105, allowing the output member 64 to be rotated, in the direction of arrow B, by the first biasing member 114 and the plate 102, to the park position 34.

Once the predetermined event has concluded, the actuator 122 is de-energized and the default-to-park mechanism 100 is placed in the latched position 139. The output member 64 may then be rotated to any of the park position 34, the reverse position 36, the neutral position 38, and the drive position 40. The plate 102 may then be latched as described above, with reference to FIGS. 5B-5D.

Figure 6A:
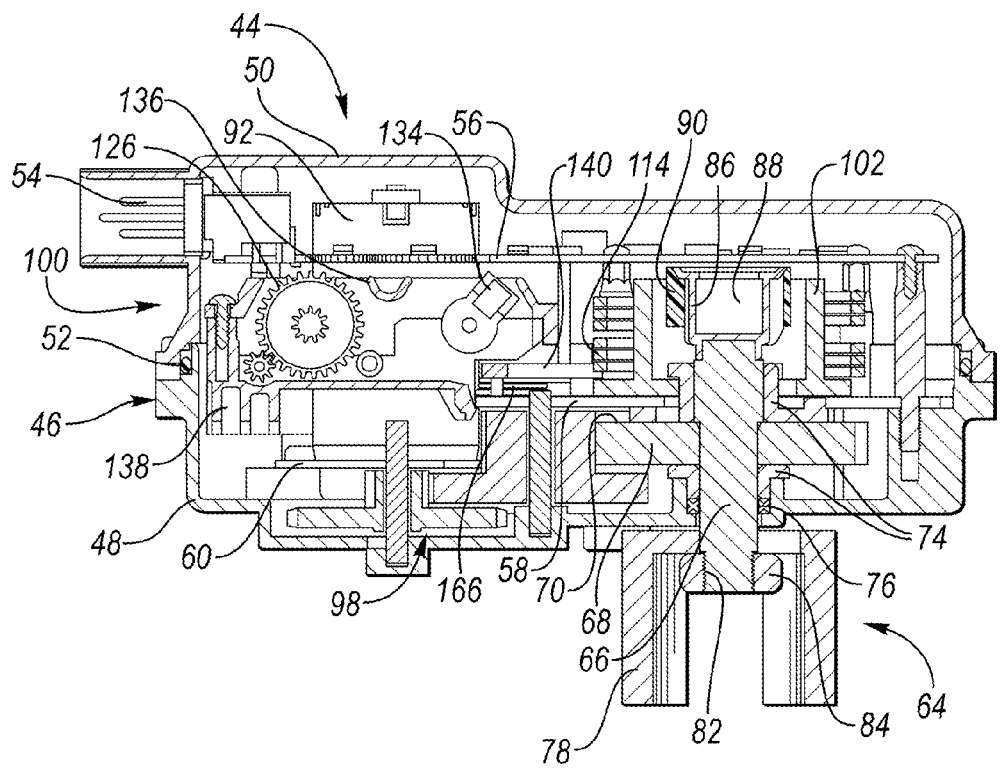
FIG. 6A is a schematic cross sectional illustration taken at lines 6A-6A in FIG. 4, including a view behind the cross section, of the gear selection mechanism with the default-to-park mechanism of FIG. 4.
Figure 6B:
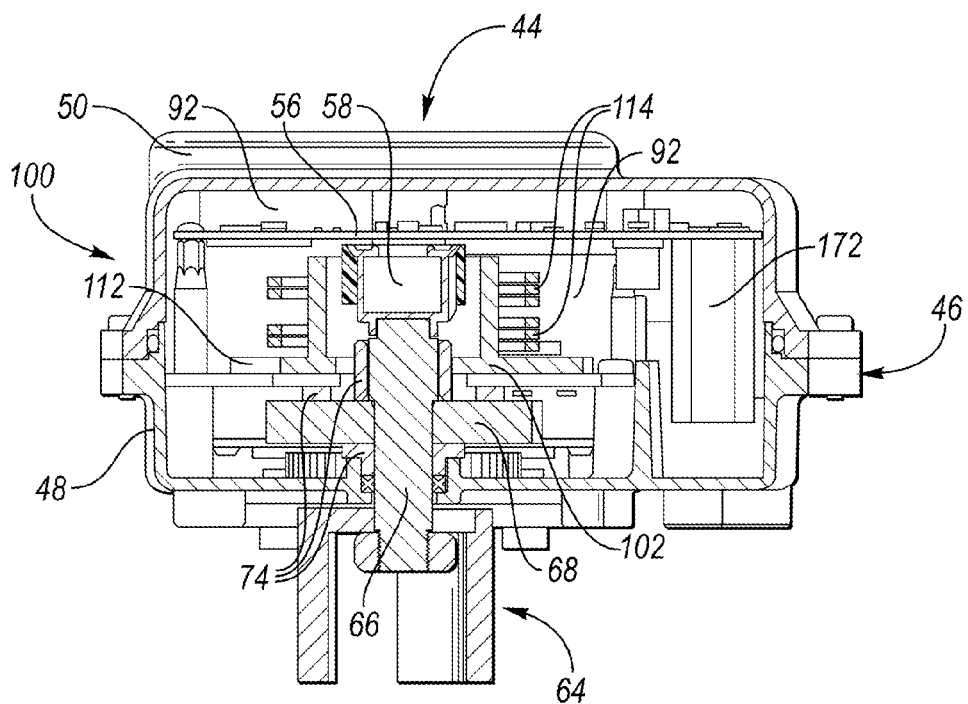
FIG. 6B is a second schematic cross sectional illustration taken at lines 6B-6B of FIG. 4, including a view behind the cross section, of the gear selection mechanism with the default-to-park mechanism of FIG. 4.

Referring now to FIG. 6A-6B, the gear selection mechanism 44 may include an output shaft bushing 74. The output shaft bushing 74 may serve as a bushing for both the output member 64 and the plate 102. The output shaft bushing 74 may also retain the output gear 68 between the watch plate 58 and the case 46 and may retain the plate 102 on the output member 64. The output shaft bushing 74 can also be seen in FIG. 8.

The gear selection mechanism 44 may include a motor plate 60 for mounting the output motor 92. The gear selection mechanism 44 may include an electrical connector 54 for connecting the gear selection mechanism 44 to the operator interface 28 and to the vehicle 20 power and control wires. The output shaft 66 may include a thread 82. The output member 64 may include a nut 84 and a key (not shown) to fasten the output coupling 78 to the output shaft 66. The gear selection mechanism 44 may include a seal 52 between the base 48 and the cover 50 of the case 46 and a seal 76 between the case 46 and the output shaft 66.

The default-to-park mechanism 100 may also include a first position sensor 88 mounted to the output member 64 for sensing the position of the output member 64. The first position sensor 88 may be mounted to the output member 64 via a position sensor extension 86 attached to the output member 64. The first position sensor 88 may be a magnet configured to interact with an electronic device (not shown) mounted on a printed circuit board 56. The default-to-park mechanism 100 may include an electromagnetic shield 90 to shield the printed circuit board 56 from a magnetic field of the first position sensor 88.

The default-to-park mechanism 100 may include a second position sensor 134 mounted to the latching mechanism 120 for sensing the position of the trip arm 128. The second position sensor 134 may be a magnet configured to interact with an electronic device (not shown) mounted on the printed circuit board 56. The second position sensor 134 may be mounted to the trip arm 128.

Figure 9:
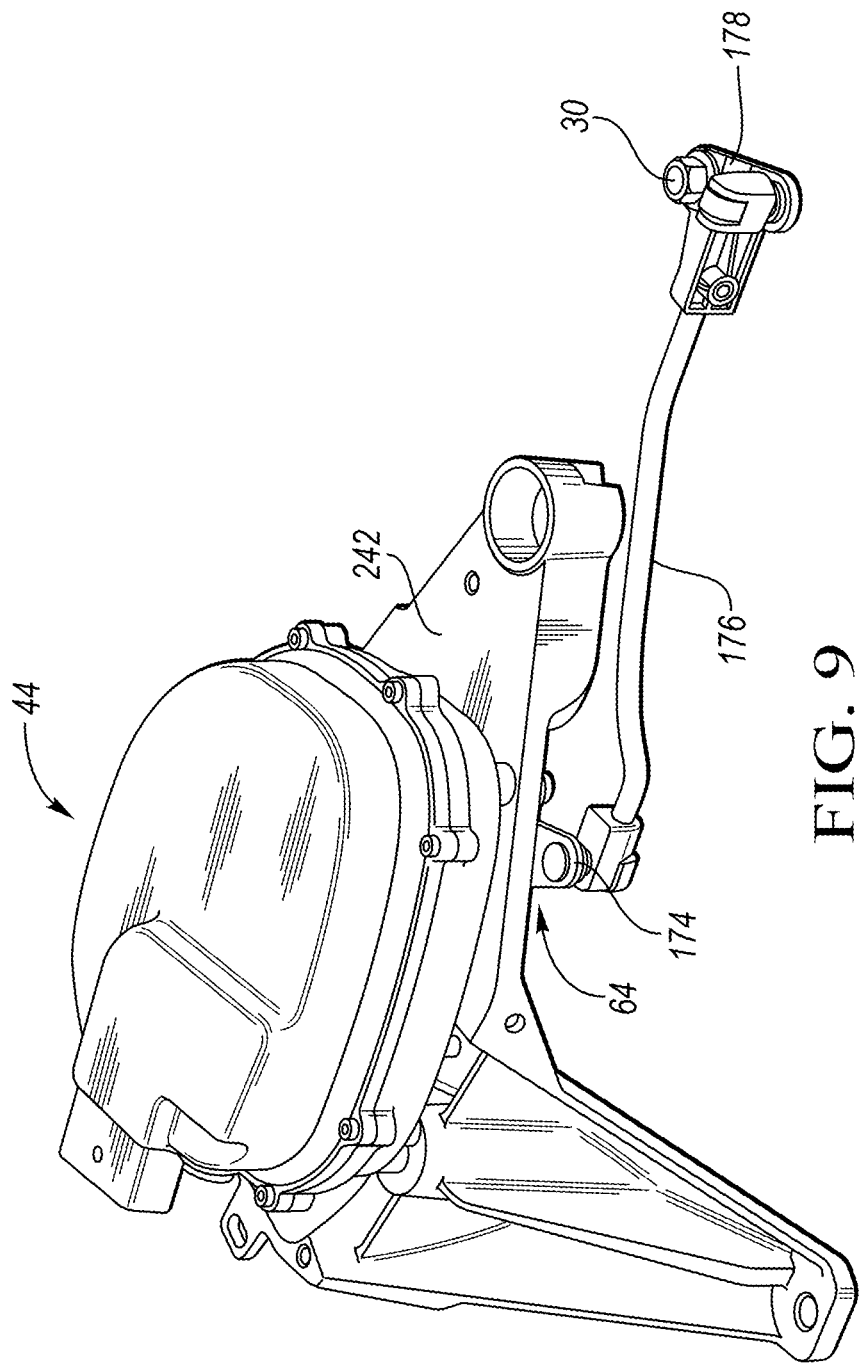
FIG. 9 is a schematic illustration in perspective view of another embodiment of the gear selection mechanism with the default-to-park mechanism of FIG. 1 operatively connected to the transmission mode selector.

Referring now to FIG. 9, an alternative embodiment of the output member 64 operative connection to the transmission mode selector 30 is shown. In this embodiment, the output member 64 includes an output arm 174 attached to the output shaft 66. The end of the output arm 174 is pivotably attached to one end an output link 176. The other end of the output link 176 is pivotably attached to the end of a mode selector arm 178. The mode selector arm is attached to the transmission mode selector 30. The output link 176 may be a straight rod, a bent rod, or any other suitable shape. The output link 176 may be round in cross section of may have any other suitable cross section.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A mechanism for a transmission having a park mode and multiple additional modes, the mechanism comprising:
    an output member operatively connectable to the transmission and rotatable to predetermined positions including a park position correlated with the park mode and multiple additional positions correlated with the multiple additional modes, respectively;
    a rotatable plate coaxial with the output member; wherein the plate and the output member are configured to interfere with one another such that the plate is moved in a first direction of rotation by the output member when the output member is rotated in the first direction of rotation, and the output member is moved in a second direction of rotation by the plate when the plate moves in the second direction of rotation; wherein the second direction of rotation is opposite from the first direction of rotation;
    a latching mechanism; wherein the plate is configured to be releasably held by the latching mechanism to prevent rotation in the second direction of rotation when the output member is in any one of the multiple additional positions; and
    a first biasing member biasing the plate to rotate in the second direction of rotation to return the output member to the park position when the plate is released by the latching mechanism.

2. The mechanism of claim 1, wherein the plate has at least two features; and wherein each of the features is configured to receive the latching mechanism.

3. The mechanism of claim 2, wherein the multiple additional modes include a reverse mode, a neutral mode, and a drive mode; wherein the multiple additional positions include a reverse position, a neutral position, and a drive position correlated with the reverse mode, the neutral mode, and the drive mode, respectively; and wherein each of the features is positioned on the plate to align the output member with one of the reverse, neutral, and drive positions when the latching mechanism is received.

4. The mechanism of claim 3, wherein the features are notches.

5. The mechanism of claim 4, wherein the plate has a segment with a radius; wherein the segment includes the notches; and wherein the radius of the segment is sized such that each of the notches is sufficiently large to receive the latching mechanism.

6. The mechanism of claim 5, wherein the latching mechanism includes a selectively energizable actuator;
    wherein, when the actuator is de-energized, the latching mechanism is configured to allow the plate to be rotated in the first direction of rotation and to be received in any one of the notches to prevent rotation of the plate in the second direction of rotation; and
    wherein, when the actuator is energized, the latching mechanism is configured to withdraw from said any one of the notches to release the plate to rotate in the second direction of rotation.

7. The mechanism of claim 6, wherein the latching mechanism includes:
    an arm operatively connected to the actuator;
    a latch cam operatively connected to the arm and configured to be received in any one of the notches; and
    a second biasing member biasing the latch cam into contact with the plate when the actuator is de-energized.

8. The mechanism of claim 7, wherein the selectively energizable actuator is an electric motor.

9. The mechanism of claim 8, further comprising a capacitor; wherein the actuator is energized by the capacitor.

10. The mechanism of claim 1, wherein the first biasing member is a helical torsion spring.

11. The mechanism of claim 1, further comprising:
    an output gear attached to the output member; and
    an output motor operatively connected to the output gear and configured to provide torque to rotate the output gear.

12. The mechanism of claim 11, wherein the first biasing member exerts a torque sufficient to overcome the torque of the output motor.

13. The mechanism of claim 12, wherein the output motor is an electric motor.

14. The mechanism of claim 1, wherein the output member has a surface and an output tab; wherein the plate has an edge and a plate tab;
  wherein the output tab extends axially from the surface;
  wherein the plate tab extends radially from the edge; and
  wherein the output tab and plate tab are configured to interfere with one another such that the plate is moved in a first direction of rotation by the output member when the output member is rotated in the first direction of rotation, and the output member is moved in a second direction of rotation by the plate when the plate moves in the second direction of rotation.

15. The mechanism of claim 1, further comprising a first position sensor mounted to the output member.

16. The mechanism of claim 15, further comprising a second position sensor mounted to the latching mechanism.

17. A vehicle comprising:
  a transmission, having a park mode and multiple additional modes and a mode selector rotatable to predetermined positions including a park position correlated with the park mode and multiple additional positions correlated with the multiple additional modes, respectively;
  an operator interface; and
  a gear selection mechanism operatively connected to the operator interface and including:
    an output member operatively connected to the mode selector to move the mode selector to a selected one of the park position and the multiple additional positions according to a selection input at the operator interface; and
    a default-to-park mechanism configured to override the selection input and shift the transmission to the park mode, the default-to-park mechanism having:
      a rotatable plate coaxial with the output member; wherein the plate and the output member are configured to interfere with one another such that the plate is moved in a first direction of rotation by the output member when the output member is rotated in the first direction of rotation, and the output member is moved in a second direction of rotation by the plate when the plate moves in the second direction of rotation; wherein the second direction of rotation is opposite from the first direction of rotation;
      a latching mechanism; wherein the plate is configured to be releasably held by the latching mechanism to prevent rotation in the second direction of rotation when the output member is in any one of the multiple additional positions; and
      a first biasing member biasing the plate to rotate in the second direction of rotation to return the output member to the park position when the plate is released by the latching mechanism.

18. The vehicle of claim 17, wherein the operator interface is electronically connected to the gear selection mechanism.

19. The vehicle of claim 17, wherein the multiple additional modes include a reverse mode, a neutral mode, and a drive mode; wherein the multiple additional positions include a reverse position, a neutral position, and a drive position correlated with the reverse mode, the neutral mode, and the drive mode, respectively; wherein the plate has at least two features configured to receive the latching mechanism; and wherein each of the features is positioned on the plate to align the output member with one of the reverse, neutral, and drive positions when the latching mechanism is received.

20. The vehicle of claim 19, wherein the plate has a segment with a radius; wherein the features are notches; wherein the segment includes the notches; and wherein the radius of the segment is sized such that each of the notches is sufficiently large to receive the latch mechanism.

* * * * *